United States Patent [19]

Horii

[11] Patent Number: 5,203,893
[45] Date of Patent: Apr. 20, 1993

[54] OZONE FILTER UNIT FOR AN ELECTROPHOTOGRAPHIC APPARATUS

[75] Inventor: Yosiharu Horii, Shizuoka, Japan

[73] Assignee: Tokyo Electric Co., Ltd., Tokyo, Japan

[21] Appl. No.: 827,169

[22] Filed: Jan. 28, 1992

[30] Foreign Application Priority Data

Jan. 29, 1991 [JP] Japan .................................. 3-8060

[51] Int. Cl.⁵ .......................................... B01D 50/00
[52] U.S. Cl. .................... 55/385.1; 55/493; 55/467; 55/481; 355/215
[58] Field of Search ................ 55/467, 493, 481, 504, 55/506, 507, 387, 285.1; 355/215

[56] References Cited

U.S. PATENT DOCUMENTS

| | | | |
|---|---|---|---|
| 1,521,576 | 12/1924 | Wittemeier | 55/506 |
| 2,575,499 | 11/1951 | Manow | 55/506 |
| 3,626,669 | 12/1971 | Cardiff | 55/481 |
| 5,117,262 | 5/1992 | Yamaguchi | 355/215 |

FOREIGN PATENT DOCUMENTS 63-266467 11/1988 Japan .
28531 1/1990 Japan .

Primary Examiner—Bernard Nozick
Attorney, Agent, or Firm—Oblon, Spivak, McClelland, Maier & Neustadt

[57] ABSTRACT

A filter case having open opposite ends is disposed with one of the open ends thereof facing an air exit formed in the side wall of the housing of an electrophotographic apparatus, and a filter element holding frame having an upper opening through which an ozone filter element is inserted therein is supported pivotally at its lower end on the lower portion of the filter case for turning about a substantially horizontal axis so as to be fitted in the filter case. In changing the ozone filter element, the cover is opened, the filter element holding frame is turned about the substantially horizontal axis to expose the upper opening thereof outside the filter case so that the ozone filter element can be taken out through the upper opening from the filter element holding frame. The wide, open upper space in the housing facilitates the filter element changing operation. Since the wide, open upper space in the housing is available for taking out the ozone filter element from and inserting the same in the filter element holding frame, the space between the inner surface of the side wall of the housing and the filter case may be relatively small and hence the size of the housing can be reduced accordingly.

3 Claims, 2 Drawing Sheets

OZONE FILTER UNIT FOR AN ELECTROPHOTOGRAPHIC APPARATUS

FIELD OF THE INVENTION AND RELATED ART STATEMENT

The present invention relates to an ozone filter unit for an electrophotographic apparatus.

An electrophotographic apparatus charges a photoconductive body by a charger prior to forming an electrostatic latent image on the photoconductive body. In transferring a toner image formed on the photoconductive body to a recording sheet, an electric discharge is produced between a charger and the photoconductive body to charge the recording sheet. A discharge of negative polarity produces ozone injurious to human. Accordingly, an ozone filter unit is provided near a cooling exhaust blower to remove ozone from air containing ozone. FIG. 3 shows a conventional ozone filter unit for such a purpose.

Referring to FIG. 3, an ozone filter element 17 provided on its upper side with a lug 25 is fitted in a filter case 24 having opposite open ends. A filter element holding frame 26 is provided integrally with hooks 27 on its right and left sides. The filter element holding frame 26 is joined to the filter case 24 with the hooks 27 elastically engaging openings 28 formed in the opposite side walls of the filter case 24. Generally, the filter case 24 is disposed with its open end facing an air exit opening formed in the side wall of the housing of an electrophotographic apparatus, not shown.

In changing the ozone filter element 17, the filter element holding frame 26 is separated from the filter case 24, and then the ozone filter element 17 is gripped by the lug 25 and is pulled out from the filter case 24. In removing the ozone filter element 17 from the filter case 24, the filter element holding frame 26 and the ozone filter element 17 must be pulled in the direction of flow of exhaust air. On the other hand, the filter case 24 must be disposed with a narrow space between its open end and the inner surface of the housing to discharge exhaust air through the air exit of the housing of the electrophotographic apparatus. Therefore, only a narrow space is available for handling the ozone filter element 17 and the filter element holding frame 26, which makes operations for removing the ozone filter element 17 from and fitting the same in the filter case 24 very difficult. Increase in the space between the open end of the filter case 24 and the inner surface of the housing to facilitate operations for removing the ozone filter element 17 from and fitting the same in the filter case 24 entails increase in size of the housing.

OBJECT AND SUMMARY OF THE INVENTION

Accordingly, it is a first object of the present invention to enable the housing of an electrophotographic apparatus to be formed in a relatively small size.

A second object of the present invention is to facilitate operations for removing the ozone filter element from and fitting the same in the filter case.

The present invention provides an ozone filter unit comprising: a housing containing an image forming unit and opening upward; a cover pivotally supported on the housing so as to cover the open upper space in the housing; a filter case having an open end facing an air exit formed in the housing and an opposite open end; an exhaust blower disposed within the filter case or near the open end of the same; and a filter element holding frame having an upper opening to receive an ozone filter element therethrough, and pivotally joined for turning about a substantially horizontal axis to the lower portion of the filter case so as to be fitted in the open end of the filter case on the side of the air exit.

In changing the ozone filter element, the cover is opened and the filter element holding frame is turned on the substantially horizontal axis to place the upper portion of the filter element holding frame outside the filter case. A wide, open upper space in the housing available for changing the ozone filter element facilitates filter element changing operation. Since only the upper opening of the filter element holding frame needs to be placed outside the filter case for filter element changing operation, the filter element holding frame needs to be turned through a small angle and hence the space between the inner surface of the housing and the filter case may be relatively small, which enables the housing to be formed in a relatively small size.

DETAILED DESCRIPTION OF THE PREFERRED EMBODIMENTS

Figure 1:
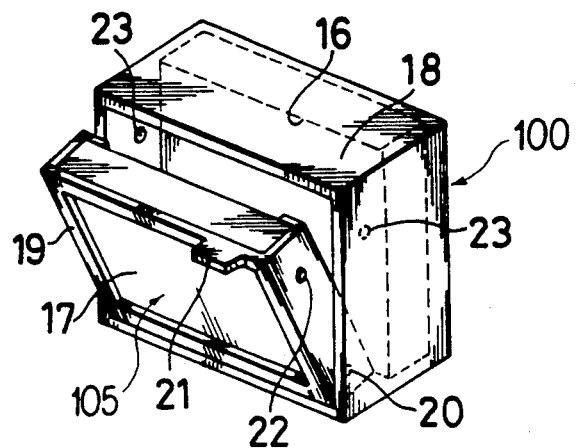
FIG. 1 is a perspective view of an ozone filter unit in a preferred embodiment according to the present invention.

An ozone filter unit in a preferred embodiment according to the present invention will be described with reference to FIGS. 1 and 2. Referring to FIG. 2 showing the internal construction of an electrophotographic apparatus, there are shown a housing 1, and a cover 3 for covering an open upper portion 2 in the housing 1, pivotally supported on the housing 1 by pivots 4. An image forming unit 5 contained in the housing 1 comprises a photoconductive body 6, a charger, not shown, for charging the photoconductive body 6, an exposure unit 7 for irradiating the charged surface of the photoconductive body 6 by light signals corresponding to image signals to form an electrostatic latent image on the surface of the photoconductive body 6, a developing unit 8 for developing the electrostatic latent image in a visible image, a feed roller 9 for feeding a recording sheet delivered from a recording sheet cassette 10, a transfer charger 12 for transferring the visible image from the photoconductive body 6 of the recording sheet, a register roller 11 for inserting the recording sheet between the photoconductive body 6 and the transfer charger 12, fixing rollers 13 for pressing the recording sheet therebetween to fix the visible image on the recording sheet, and a delivery path 14 for delivering the recording sheet conveying the fixed visible image to a delivery tray 15 provided on the upper surface of the cover 3. An air exit, not shown, is formed near the fixing rollers 13 in the side wall of the housing 1, and a filter case 18 containing an exhaust blower 16 and an ozone filer element 17 is disposed inside the housing 1 opposite to the air exit.

Figure 2:
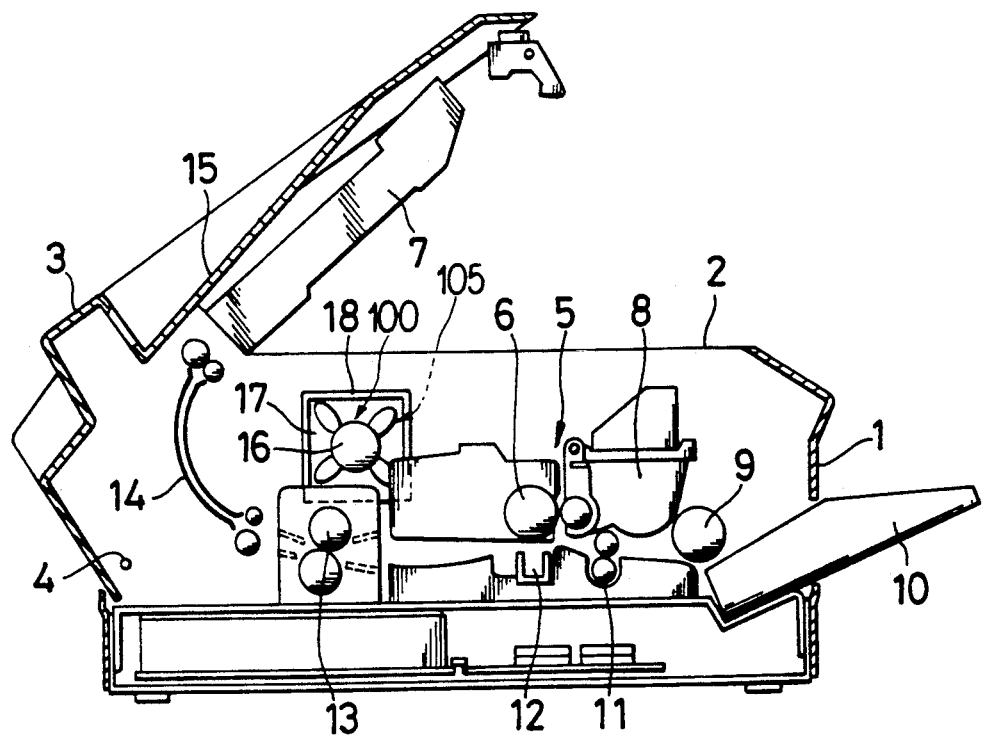
FIG. 2 is a longitudinal sectional view of an electrophotographic apparatus.
Figure 3:
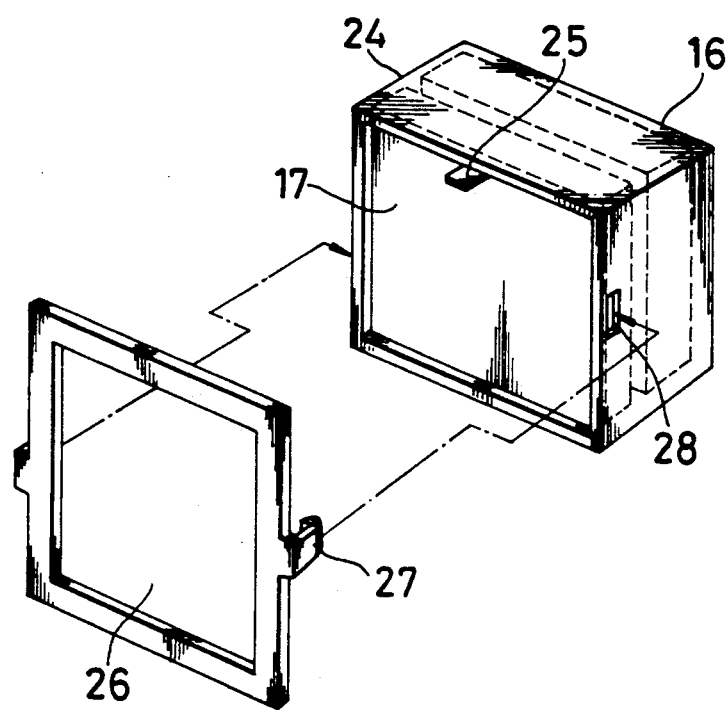
FIG. 3 is a perspective view of a conventional ozone filter unit.

As shown in FIG. 1, the filter case 18 has the shape of a box having opposite open ends. A filter element holding frame 19 having an upper opening is supported pivotally by pivots 20 on the lower portion of the filter case 18 at the open end on the side of the air exit of the housing 1. The filter element holding frame 19 is provided with a lug 21 on its upper side, and projections 22 respectively on its opposite side surfaces. When the filter element holding frame 19 is put in place in the filter case 18, the projections 22 engage holes 23 formed in the opposite side walls of the filter case 18 to hold the filter element holding frame 19 in place. The ozone filter element 17 is inserted through the upper opening in the filter element holding frame 19.

When the exhaust blower 16 is driven, air containing ozone produced around the photoconductive body 6 and hot air heated mostly by the heat generated by the fixing rollers 13 are sucked into the filter case 18 and are discharged outside through the air exit of the housing 1. Ozone contained in the air is filtered by the ozone filter element 17 while the air flows through the filter case 18.

In replacing the ozone filter element 17 with a new one, the cover 3 is opened in a position shown in FIG. 2, and then the filter element holding frame 19 is turned outward on the pivots 20 so that the upper opening of the filter element holding frame 19 is exposed outside the filter case 18 a shown in FIG. 1. The ozone filter element 17 can readily be taken out through the upper opening of the filter element holding frame 19 in the wide, open upper space 2 in the housing 1. The filter element holding frame 19 needs to be turned through a small angle in changing the ozone filter element 17 because only the upper opening of the filter element holding frame 19 needs to be exposed outside the filter case 18. Therefore, the space between the inner surface of the housing 1 and the filter case 18 may be relatively small and hence the size of the housing 1 can be reduced accordingly.

As stated above, the ozone filter unit of the present invention comprises: the housing containing the image forming unit and having the open upper space; the cover pivotally supported on the housing so as to cover the open space in the housing; the filter case having opposite open ends and disposed with one open end thereof facing the air exit formed in the housing; the exhaust blower provided within the filter case or near the open end and the filter element holding frame having the upper opening, detachably holding the ozone filter element, and pivotally supported at its lower end on the lower portion of the side walls of the filter case near the open end of the filter case on the side of the air exit of the housing so as to be turned about a substantially horizontal axis. In changing the ozone filter element the cover is opened and the filter element holding frame is turned about the substantially horizontal axis to expose the upper opening of the filter element holding frame outside the filter case. The wide, open upper space in the housing facilitates inserting the ozone filter element in and removing the same from the filter element holding frame through the upper opening of the filter element holding frame. Since only the upper opening of the filter element holding frame needs to be exposed outside the filter case in changing the ozone filter element, the filter element holding frame needs to be turned only through a small angle. Therefore, the space between the inner surface of the side wall of the housing and the filter case may be relatively small and hence the size of the housing can be reduced accordingly.

What is claimed is:

1. An ozone filter unit for an electrophotographic apparatus, comprising:
   a housing having an upwardly facing opening for defining an upper space in the housing, said housing containing an image forming unit disposed in the housing;
   a cover pivotally supported on the housing for covering the opening;
   a filter case having an open end facing an air exit formed in the housing and an opposite open end;
   an exhaust blower positioned in the filter case for drawing in air through said air exit;
   a filter element for removing ozone from air drawn through the air exit by said exhaust blower which contains ozone produced by said image forming unit; and
   a filter element holding frame having an upper opening for receiving said filter element therethrough, said holding frame being pivotally connected to a lower portion of the open end of the filter case for permitting the pivoting of said holding frame about a substantially horizontal axis, wherein said holding frame with said filter element disposed therein is pivotable from a closed position in which said frame is fitted in said open end of the filter case for removing ozone from the air, and an opened position for permitting the insertion of said filter element through the open upper space of the housing and into the frame, and the removal of the filter element from the frame and through the open upper space of the housing.

2. An ozone filter unit for an electrophotographic apparatus according to claim 1, wherein the cover is supported pivotally by pivots on the housing, and the axis about which the filter element holding frame is turned extends in the direction substantially perpendicular to the axis about which the cover is turned.

3. An ozone filter unit for an electrophotographic apparatus according to claim 1, wherein the filter element holding frame for holding the ozone filter element is provided with a lug on its upper side.

* * * * *

UNITED STATES PATENT AND TRADEMARK OFFICE
CERTIFICATE OF CORRECTION

Page 1 of 2

PATENT NO. : 5,203,893
DATED : April 20, 1993
INVENTOR(S) : YOSIHARU HORII

It is certified that error appears in the above-indentified patent and that said Letters Patent is hereby corrected as shown below:

Column 2, line 27, delete "and";

line 29, change "." to --;--;

between lines 29 and 30, insert the following:

--Fig. 4 is a perspective view of the ozone filter unit taken from the rear of Fig. 1; and Fig. 5 is a longitudinal sectional view of the electrophotographic apparatus taken from the rear of Fig. 2.--;

line 35, change "FIG. 2" to --FIGS. 2 and 5--;

line 59, change ", not shown," to --100--;

line 63, after "exit" insert --100--;

line 64, change "FIG. 1" to --FIGS. 1 and 4--.

Column 3, line 13, after "sucked" insert --through the air inlet 105 located inside the housing 1--;

UNITED STATES PATENT AND TRADEMARK OFFICE
CERTIFICATE OF CORRECTION

PATENT NO.   : 5,203,893
DATED        : April 10, 1993
INVENTOR(S)  : Yosiharu Horii It is certified that error appears in the above-indentified patent and that said Letters Patent is hereby corrected as shown below:

Column 3, line 14, after "exit" insert --100--.

Signed and Sealed this

Seventh Day of March, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,203,893
DATED : April 20, 1993
INVENTOR(S) : Yosiharu HorII

It is certified that error appears in the above-indentified patent and that said Letters Patent is hereby corrected as shown below:

The title Page, showing an illustrative figure, should be deleted and substitute therefor the attached title page.

Signed and Sealed this

Thirteenth Day of June, 1995

Attest:

BRUCE LEHMAN

Attesting Officer

Commissioner of Patents and Trademarks

United States Patent [19]

Horii

[11] Patent Number: 5,203,893
[45] Date of Patent: Apr. 20, 1993

[54] OZONE FILTER UNIT FOR AN ELECTROPHOTOGRAPHIC APPARATUS

[75] Inventor: Yosiharu Horii, Shizuoka, Japan
[73] Assignee: Tokyo Electric Co., Ltd., Tokyo, Japan
[21] Appl. No.: 827,169
[22] Filed: Jan. 28, 1992
[30] Foreign Application Priority Data Jan. 29, 1991 [JP] Japan .................. 3-8060

[51] Int. Cl.$^5$ .................. B01D 50/00
[52] U.S. Cl. .................. 55/385.1; 55/493; 55/467; 55/481; 355/215
[58] Field of Search .......... 55/467, 493, 481, 504, 55/506, 507, 387, 285.1; 355/215

[56] References Cited

U.S. PATENT DOCUMENTS

| | | | |
|---|---|---|---|
| 1,521,576 | 12/1924 | Wittemeier | 55/506 |
| 2,575,499 | 11/1951 | Manow | 55/506 |
| 3,626,669 | 12/1971 | Cardiff | 55/481 |
| 5,117,262 | 5/1992 | Yamaguchi | 355/215 |

FOREIGN PATENT DOCUMENTS 63-266467 11/1988 Japan.
28531 1/1990 Japan.

Primary Examiner—Bernard Nozick
Attorney, Agent, or Firm—Oblon, Spivak, McClelland, Maier & Neustadt

[57] ABSTRACT

A filter case having open opposite ends is disposed with one of the open ends thereof facing an air exit formed in the side wall of the housing of an electrophotographic apparatus, and a filter element holding frame having an upper opening through which an ozone filter element is inserted therein is supported pivotally at its lower end on the lower portion of the filter case for turning about a substantially horizontal axis so as to be fitted in the filter case. In changing the ozone filter element, the cover is opened, the filter element holding frame is turned about the substantially horizontal axis to expose the upper opening thereof outside the filter case so that the ozone filter element can be taken out through the upper opening from the filter element holding frame. The wide, open upper space in the housing facilitates the filter element changing operation. Since the wide, open upper space in the housing is available for taking out the ozone filter element from and inserting the same in the filter element holding frame, the space between the inner surface of the side wall of the housing and the filter case may be relatively small and hence the size of the housing can be reduced accordingly.

3 Claims, 3 Drawing Sheets

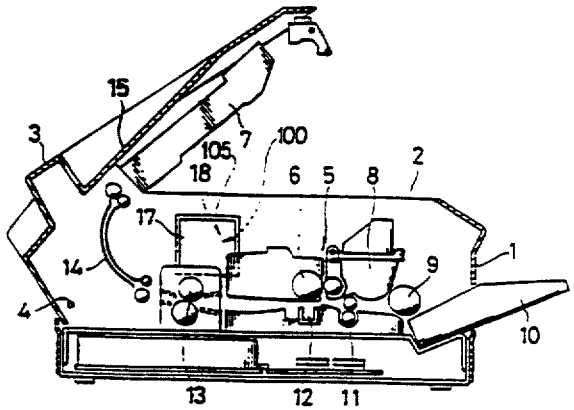

UNITED STATES PATENT AND TRADEMARK OFFICE
CERTIFICATE OF CORRECTION

PATENT NO. : 5,203,893
DATED : April 20, 1993
INVENTOR(S) : YOSIHARU HORII

It is certified that error appears in the above-indentified patent and that said Letters Patent is hereby corrected as shown below:

Please insert Figures 4-5:

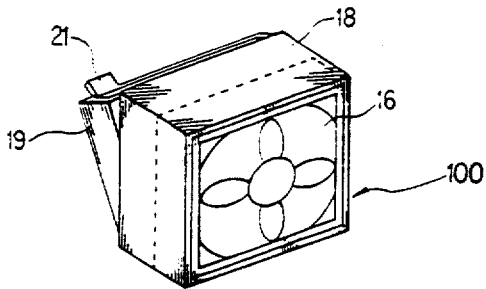

FIG.4

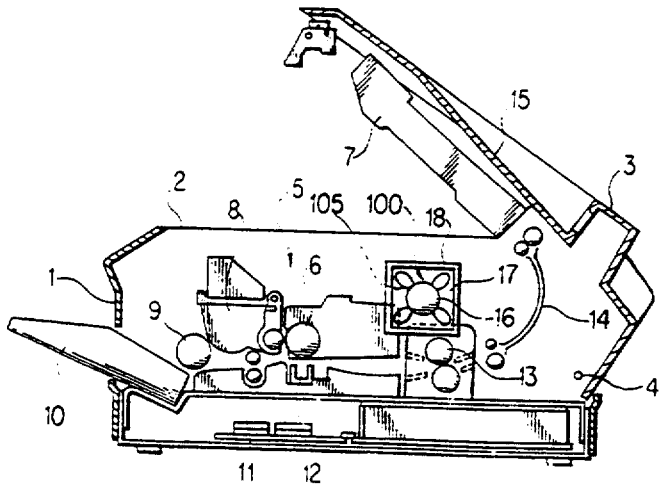

FIG.5